United States Patent [19]

Davis

[11] Patent Number: 4,961,302
[45] Date of Patent: Oct. 9, 1990

[54] SEALING BARS HAVING ASYMMETRICAL SEALING SURFACES

[75] Inventor: Steven D. Davis, Yuciapa, Calif.

[73] Assignee: W. A. Lane Inc., San Bernardino, Calif.

[21] Appl. No.: 357,796

[22] Filed: May 30, 1989

[51] Int. Cl.$^5$ .......................... B65B 9/12; B65B 51/30
[52] U.S. Cl. ........................................ 53/451; 53/479; 53/554; 53/373; 156/583.1
[58] Field of Search ................ 53/479, 451, 551, 554, 53/555, 373; 156/583.1, 583.3

[56] References Cited

U.S. PATENT DOCUMENTS

| | | | |
|---|---|---|---|
| 3,210,908 | 10/1965 | Samberg | 53/555 X |
| 3,295,289 | 1/1967 | Critchell | 53/551 X |
| 3,673,041 | 6/1972 | Schulz et al. | 53/479 X |
| 3,679,509 | 7/1972 | Fielibert | 53/373 X |
| 3,982,991 | 9/1976 | Hamm et al. | 53/373 X |
| 4,004,399 | 1/1977 | Borrello | 53/554 |
| 4,369,611 | 1/1983 | Canfield | 53/373 X |
| 4,586,317 | 5/1986 | Bussell | 53/373 X |
| 4,676,051 | 6/1987 | June | 53/373 X |
| 4,715,166 | 12/1987 | Kameda | 53/373 X |

Primary Examiner—Horace M. Culver
Attorney, Agent, or Firm—Herb Boswell

[57] ABSTRACT

A pair of sealing bars for a pouch packaging machine have sealing surfaces which are asymmetrical with respect to one another. The sealing surface on one of the sealing bars is flat and smooth, having linear edges in two perpendicular directions. The sealing surface on the other of the sealing bars is shaped as a portion of a curved cylindrical surface, defined by a linear edge in a first direction and an arcuate edge in a perpendicular direction. The bars are positioned with respect to one another such that the curved sealing surface on the one bar convexly projects toward the flat, planar sealing surface on the other bar. Seals formed with these asymmetrical sealing bars have a sealing bead which is thinner in the center and thickens outwardly toward both ends moving away from the center.

16 Claims, 2 Drawing Sheets

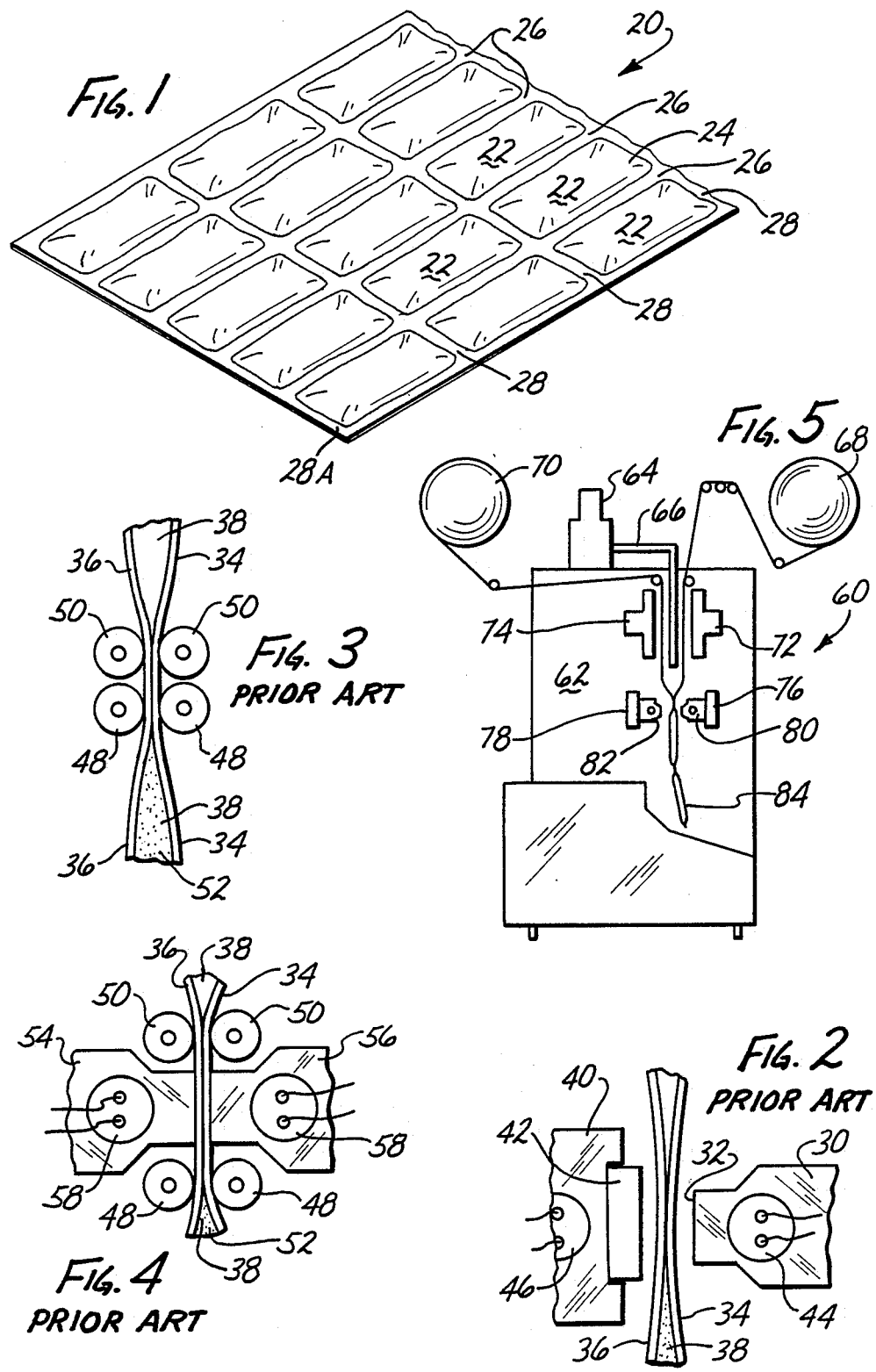

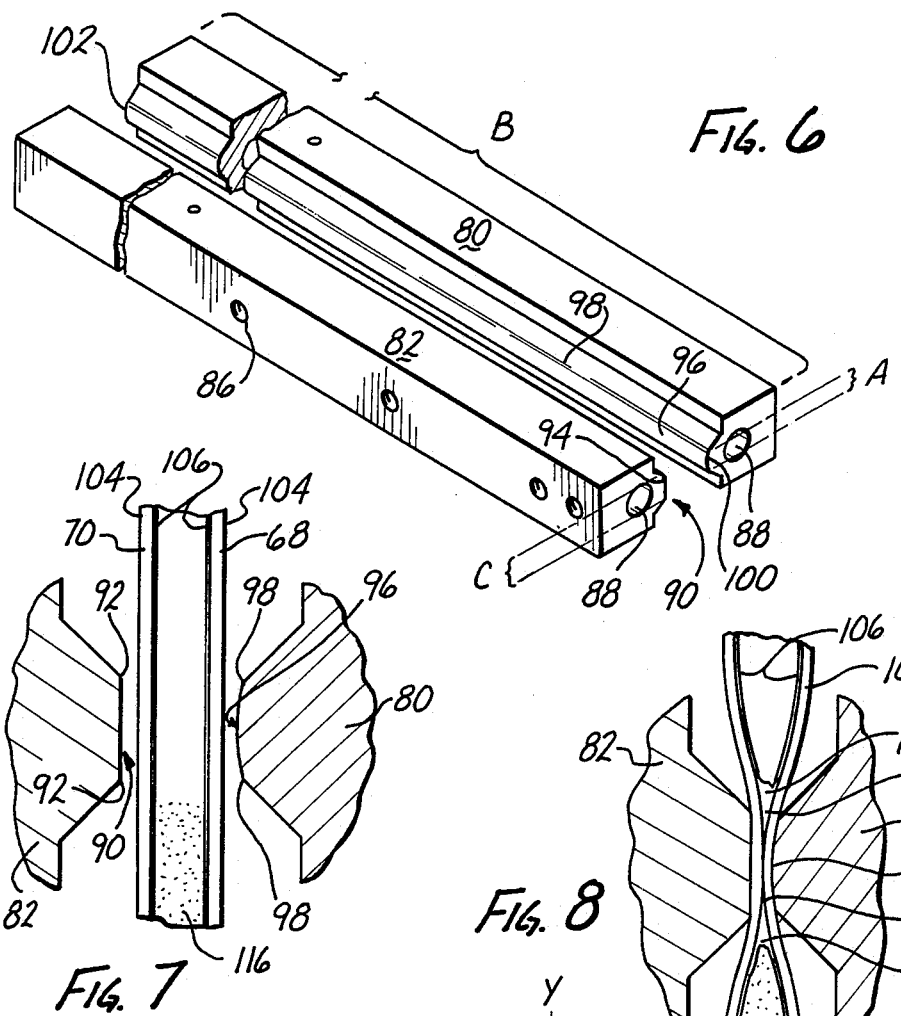
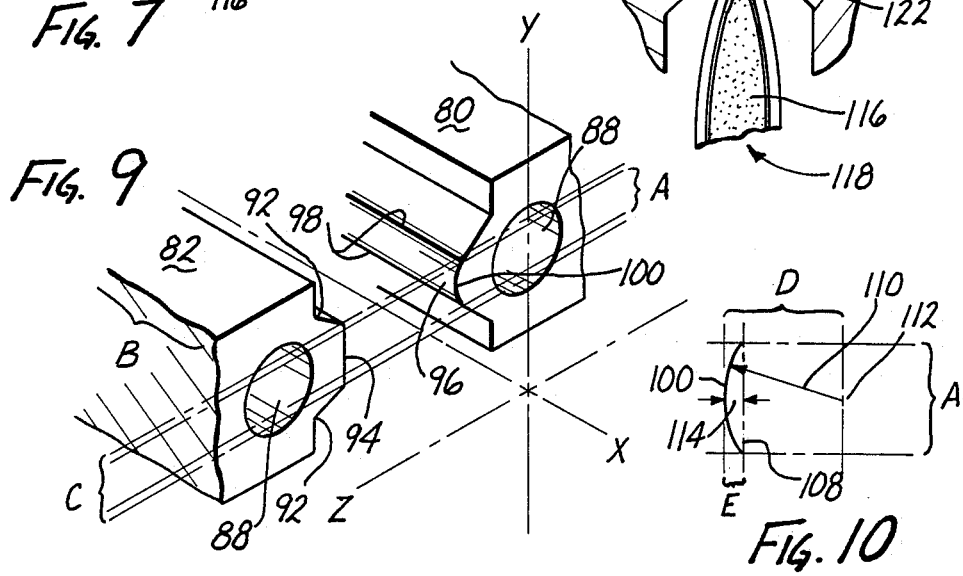

SEALING BARS HAVING ASYMMETRICAL SEALING SURFACES

BACKGROUND OF THE INVENTION

This invention is directed to a seal for a pouch packaging machine. The seal includes first and second seal bars each having a sealing surface. The sealing surface of the two bars are asymmetrical with respect to one another.

Many commodities are packaged on form, fill and seal packaging machines. Packaging pouches are formed on the machines from rolls of polymeric or metallized films or combinations of the same. The pouches are filled, sealed and then disconnected from an advancing stream of the pouches for distribution and ultimately customer consumption.

Alternatively to separating the individual pouches formed on form, fill and seal pouch machines, the pouches are filled with a liquid and are maintained joined together in a checker board like matrix. These checker board like pouch matrices are commonly termed blankets. If a so-called blanket is cooled such that the liquid within its pouches or cells is frozen, the blanket can then be transferred to a container to cool the contents of that container. Further, such "cold blankets" can be used for medical purposes as cold compresses for treating sprains and other injuries. In a like manner a liquid filled blanket can be heated and used for transferring heat.

It is important in the above referenced liquid filled blankets that the individual pouches or cells of the blanket can be completely filled with liquid and be void of gas. Any gas within an individual cell or pouch of such a blanket is subject to large volume changes on cooling and heating. Such volume changes can lead to rupture and/or premature failure of an individual cell or pouch of such a blanket. If the cell or individual pouch is ruptured its liquid contents would be lost which, at the minimum, would compromise the efficiency of the blanket, or in its extreme, would render the blanket useless.

In forming one of the above referred to blankets on a form, fill and seal pouch packaging machine, the machine is equipped with a plurality of pairs of side seals. The individual members of the pairs of side seals come together to form a series of parallel tubes in the film or webbing being processed on the pouch machine. A first cross seal is formed to form a bottom in each of these tubes and liquid is then injected. Further cross seals must now be made through the liquid to form the cells of the blanket.

Seals are formed on form, fill and seal packaging machines by heating the individual films under pressure. The heat and pressure adhere one film to the other to form the seal. To assist in forming a seal, generally the films utilized for forming the pouches are multi-layered films specially constructed such that the inside layers will melt and/or flow together to join two films about a seal or seam. If liquid is present between the two films, the films will not adhere to one another and an ineffective and/or inefficient seal is formed. Thus, in forming any seal through a liquid, whether or not it be for the above referred blanket or for other pouch applications, it is necessary to remove the liquid from the surfaces of the films which are being sealed together.

Heretofore several expedients have been utilized to remove liquid from the surfaces of films which are being sealed together. These expedients rely on "squeegeeing" any liquid from the seal area prior to formation of the seal. Prior utilized techniques and/or apparatus to form seals through liquids have certain inherent drawbacks therein. These drawbacks include complex mechanisms which are subject to wear and breakdown, or the use of materials as, for instance, silicon rubber, which are poor heat conductors.

In a first prior art mechanism, opposing sets of rollers are utilized to squeeze liquid out between films in a "wringer" like manner. Aside from requiring complex mechanical actions, these roller like devices pressurize the individual cells of a blanket and when this pressure is released, the pressure can disrupt a freshly made seal.

A further type device utilizes a silicon rubber pad on one side of the seal and a sealing bar on the other. The sealing bar squeezes the films against the silicon rubber pad. Because the silicon pad is constantly being flexed and unflexed, wear can occur. Further, the silicon rubber pad is a less efficient heat transfer mechanism than a metal sealing bar and thus it is more difficult to evenly heat the films to an optimum sealing temperature. Further, if a flat surface is utilized on the sealing bar which mates against the silicon rubber pad, because the silicon rubber pad can locally deflect, it is possible to trap beads of liquid between the films along the area of the seal. This degrades the seal.

BRIEF DESCRIPTION OF THE INVENTION

In view of the above it is evident that there exists a need for new and improved seals and sealing techniques for forming seals through the liquid contents of a pouch or blanket being formed. It is a broad object of this invention to provide for seals and processes of using the same for more efficiently forming seals through liquids. It is a further object of this invention to provide for seals which are simple in construction and which avoid the use of rubber components therein.

These and other objects as will become evident from the remainder of this specification are achieved in a seal for a form, fill and seal pouch packaging machine which includes first and second opposing seal bars. The first seal bar is formed to have a hard smooth unyielding flat planar sealing surface thereon and the second seal bar is formed to have a hard smooth unyielding arcuate sealing surface thereon. The arcuate sealing surface of the second seal bar is positioned to convexly project toward the flat planar sealing surface of the first seal bar.

In a further embodiment of the invention a seal is formed utilizing first and second opposing seal bars. The first seal bar has a hard smooth unyielding first surface thereon which extends between ends in a first direction axially along the elongated dimension of the seal bars and between ends in a second direction essentially perpendicular to said first direction. The second seal bar has a hard smooth unyielding second surface thereon which extends between ends in said first direction along the elongated dimension of the seal bar and between ends in the second direction. The dimensions of the second sealing surface between its ends in the second direction is less than the dimensions of the first sealing surface between its ends in the second direction. Means are provided for positioning the seal bars with respect to one another such that the second sealing surface is positioned with respect to the first sealing surface along the second direction whereby a portion of the first sealing surface extends beyond the ends of the second sealing surface in the second direction.

The use of an arcuate sealing surface against a flat sealing surface allows for the formation of a sealing bead between first and second sealing films which has a variable thickness. The thickness of the bead varies from a thin area formed adjacent to the center of the arcuate sealing surface of the second seal bar to thicker areas outwardly from the center area.

The use of sealing bars wherein the sealing surface on the first sealing bar is wider than the sealing surface on the second sealing bar along the second direction achieves additional heating outboard of the contact or pressure area between the sealing surfaces for augmentation of formation of the sealing bead between the films.

The use of an arcuate sealing surface on the second seal bar allows for displacement of liquid between first and second films which are being sealed together without pressurizing the cell or pouch being sealed with the sealing bars.

BRIEF DESCRIPTION OF THE DRAWINGS

This invention will be better understood when taken in conjunction with the drawings wherein:

FIG. 1 is an isometric view of a blanket of connected cells or pouches which are connected together in a "checker board" like matrix;

FIG. 2 is a fragmentary elevational view of a first prior art device for forming seals through a liquid between first and second films;

FIG. 3 is a fragmentary elevational view of a further prior art device for forming seals through a liquid between first and second films and shows the device in a first orientation;

FIG. 4 is a view similar to FIG. 3 showing the device of FIG. 3 in a second orientation;

FIG. 5 is an elevational view of a form, fill and seal pouch packaging machine having a pair of cross seals of the invention located thereon;

FIG. 6 is an isometric view of first and second seal bars of the invention;

FIG. 7 is a fragmentary elevational view showing the operation of the cross seals of the invention in forming a seal between liquid filled front and back films;

FIG. 8 is view similar to FIG. 7 showing completion of the seal between the films;

FIG. 9 is a fragmentary isometric view of portions of the seal bars of FIG. 6 overlaid with certain coordinate and dimensional lines; and FIG. 10 is a diagrammatical view of a portion of the structure of FIG. 9 and further including additional dimensional lines.

This invention utilizes certain principles and/or concepts as are set forth in the claims appended hereto. Those skilled in the arts to which this invention pertain will realized that these principles and/or concepts are capable of being utilized in a variety of embodiments which may differ from the exact embodiments utilized for illustrative purposes herein. For this reason this invention is not to be construed as limited to only the illustrative embodiment, but should only be construed in view of the claims.

DETAILED DESCRIPTION OF THE INVENTION

FIG. 1 shows a prior art "blanket" which was formed on a form, fill and seal packaging machine. The blanket 20 is composed of a plurality of individual cells 22, i.e. individual pouches, which are connected together in a checker board like matrix. Each of the cells 22 is completely filled with a liquid 24. The liquid 24 could be as simple as pure water or it could be other liquids chosen because of their capacity to absorb or release heat.

A typical use of the blanket 20 would be as a cold pack. The blanket 20 would be stored in a freezer for a time sufficient to freeze the liquid 24 in its individual cells 22. The blanket 20 could then be utilized in a portable cooler as, for instance, a freeze chest for absorbing heat from the interior of the freeze chest to maintain a cool environment for the contents therein, as for instance, food or beverage.

Alternatively the blanket 20, as a cold pack, can be utilized for treating sprains and other injuries. Since all the liquid 24 is permanently contained within the cells 22, a sprain or injury can be easily and conveniently treated with the "ice" contained within the blanket 20 without any concern for the liquid which is generated when the ice melts.

The individual cells 22 of the blanket 20 are formed by a plurality of side seams, collectively identified by the numeral 26 formed between front and back films on a pouch packaging machine. A plurality of cross seams, collectively identified by the numeral 28, intersect the side seams 26 to form the individual cells 22. The side seams 26 can be made in a conventional manner on a conventional form, fill and seal pouch packaging machine since they are made between dry films prior to the introduction of any liquid therein.

After formation of the side seams 26 the films on the form, fill and seal packaging machine are advanced to a cross seal location and a first cross seal, i.e. a bottom cross seal, cross seal 28A is formed. This, in effect, forms elongated tubes having a bottom formed by cross seal 28A and side seals formed by the side seams 26. Liquid can now be injected in these tubes. This is followed by formation of the other cross seals 28 as the film advances on the form, seal and fill packaging. After a suitable number of cells 22 are created, the blanket 20 is severed along one of the cross seams 28 to separate it from the advancing films on the form, fill and seal packaging machine.

FIG. 2 shows a first prior art cross seal utilized to form cross seals 28. This cross seal utilizes a front cross seal bar 30 which has a sealing surface 32 formed thereon. Advancing front film 34 and rear film 36 have a liquid 38 located between them. Positioned on the other side of the front cross seal bar 30 is a rear cross seal bar 40. The rear cross seal bar 40 has a silicon rubber pad 42 directly opposed to the sealing surface 32 on the front seal bar 30.

A resistance heater 44 is located in an appropriate opening in the front seal bar 30. A similar resistance heater 46 is located in the rear cross seal bar 40. The front cross seal bar 30 is formed of a metal and thus is a very good conductor of heat from the resistance heater 44 to the sealing surface 32. While the body of the rear cross seal 40 is metallic and is a good conductor of heat, the silicon rubber pad 42, in fact, is not. It is thus very difficult to maintain a constant heating temperature between the front and rear cross seals 30 and 40.

Additionally, since a typical form, fill and seal packaging machine can go through hundreds of thousands of cycles a day, the silicon rubber pad, because of constantly being flexed in a heated environment will tend to degrade in time much faster than the metallic components with which it is associated.

Also, if the sealing surface 32 is flat as is seen in FIG. 2, it is possible to trap beads or droplets of liquid between the front and back films 34 and 36 and have these beads or droplets of liquid incorporated within the seal which is being formed between the films 34 and 36. This degrades or compromises the seal and in certain instances can totally render it ineffective.

While this may not be a serious problem with respect to a cross seal 28 in the middle of a blanket 20, it can, in fact, be disastrous if it happens at one of the edge cross seals, as for instance, the cross seal 28A. Any ineffective seal or channel into a cell 22 along the cross seal 28A will leak thus requiring the manufacturer to scrap the blanket 20.

FIGS. 3 and 4 show a further prior art device for effecting cross seals through liquids. In the device of these figures a lower set of rollers 48 and an upper set of rollers 50 first contact the front and back films 34 and 36 adjacent the area wherein the cross seal is desired. The rollers then move outwardly from one another to the orientation as seen in FIG. 4. In doing so they "wring" or "squeegee" any liquid between the front and back film 34 and 36 both in an upwardly and in a downwardly direction.

Since a cross seal has already been formed at the bottom of the chamber 52 being created in the device of FIGS. 3 and 4, when the rollers 48 move downwardly along the films 34 and 36, they move liquid with them forcing additional liquid into the chamber 52. Since liquid is incompressible the additional pressure created by the movement of the rollers 48 pressurize the chamber 52.

After the sets of rollers 48 and 50 have "squeegeed" the liquid out of the area of the seal, front and back cross seal bars 54 and 56 having heaters 58 located therein come together to form a cross seal. The sealing bars 54 and 56 are then retracted as are the rollers 48 and 50. However, the freshly made seal between the films 34 and 36 is still warm and when the pressure created within the chamber 52 is released upon removing the rollers 48 this still warm, fresh made seal is subjected to this pressure. The pressure can burst the seal destroying the same.

In addition, it is evident that the device of FIGS. 3 and 4 is inherently more mechanically complex than the device as, for instance, of FIG. 2 because of the necessity of the rollers 48 and 50 and other auxiliary mechanisms utilized to first engage these rollers against the films 34 and 36, move the rollers away from each other to squeegee out any liquid between the films, and then retract the rollers allowing for advancement of the films 34 and 36 for the formation of a new cross seal.

FIG. 5 shows a form, fill and seal pouch packaging machine 60. Located on the housing 62 of the machine 60 is a liquid reservoir 64. A dispensing tube 66 leads from the reservoir 64. Further located on the machine 60 is a front roll of film 68 and a rear roll of film 70. The films 68 and 70 are fed downwardly on the machine 60 between gangs of front 72 and rear 74 side seals.

In a simple single pouch form, fill and seal packaging machine there would only be two sets of side seals to form two parallel seals between the front and back films 68 and 70, however for the formation of a blanket, as for instance blanket 20 of FIG. 1, a plurality of side seals would be utilized aligned across the width of the machine 60. The use of a plurality of side by side parallel aligned side seals is common on form, fill and seal packaging machines to form either a plurality of individual cells, as for instance, the cells 22 of the blanket 20 or when individual pouches are being formed, a plurality of side by side pouches.

Located on the housing 62 below the side seals 72 and 74 is a front cross seal housing 76 and a rear cross seal housing 78. These are typically referred to as "strong backs." The strong backs are activated by mechanisms, not separately identified or shown, on the form, fill and seal packaging machine 60 to bring a front seal bar 80 and a rear seal bar 82 toward one another to effect a cross seal in an advancing blanket 84 being formed on the machine 60. With the exception of the unique front and rear cross seals 80 and 82 utilized on the machine 60, the remainder of the components of the machine 60 described above are standard as per other form, fill and seal packaging machines.

Both of the sealing bars 80 and 82 are elongated for forming an elongated cross seal between the films 68 and 70. A sealing surface, as hereinafter explained in greater detail, is formed on each of the sealing bars 80 and 82. These sealing surfaces extend completely across the elongated dimension of the bars 80 and 82. Thus, each of the sealing surfaces on the individual bars 80 and 82 will extend along a first direction along the elongated dimension of the bars 80 and 82. This first direction can thus be considered as being axially along the bars 80 and 82 and of a dimension defined by the bracket B of FIG. 6.

The sealing surface on the bar 82 is formed as a flat planar sealing surface 90. It is rectangular in shape defined by two elongated parallel linear edges collectively identified by the number 92 as seen in FIG. 7, and two shortened parallel linear edges which are perpendicular to the edges 92. One of these shortened edges, edge 94 is identified in FIGS. 6 and 9. As is seen in FIG. 6 and 9, the edge 94 of a dimension identified by the bracket C.

As opposed to the flat, planar sealing surface on the bar 82, the sealing surface 96 on the bar 80 is arcuate or curved in shape with viewed from the side. It is formed by two elongated parallel linear edges, collectively identified by the numeral 98 in FIGS. 7 and 9 which are joined together at their end by two arcuate edges, edges 100 and 102 of FIG. 6.

As herein explained in greater detail, the chord of the arcuate edges 100 or 102 is of a dimension shown by bracket A of FIGS. 6 and 9. The dimension of this chord, i.e. the dimension of bracket A, is less than the dimension across the short side of the surface 90, i.e. the dimension defined by the bracket C. Because of this the sealing surface 90 on the rear seal bar 82 extends outwardly from the sealing surface 96 on the front seal bar 80 in the vertical dimension as illustrated in FIGS. 6, 7, 8 and 9. As defined above this vertical dimension is the second dimension of the sealing surfaces, the first dimension being the elongated dimension equal to the length of the bars 80 and 82.

Because of the extension of the sealing surface 90 with respect to the sealing surface 96 and because both of the sealing bars 80 and 82 are heated, when front and back films 68 and 70 are engaged by the bars 80 and 82 in forming a cross seal, there is an area between the sealing surfaces 90 and 96 which is both under pressure and is heated. Additionally, however, there is an area out board of the sealing surface 96 which is not pressurized, but which is heated by the extension of the surface 90 beyond the surface 96.

For forming pouches, blankets and the like on form, fill and seal pouching machines, generally, multilayer films are utilized. Such films have anywhere from two to eleven or twelve individual layers. The individual layers of the film are formed of various materials to achieve various packaging results. The materials can include metallic films and various polymeric films. Typical polymeric films include polyethylene, polypropylene and nylon films, and typical metal films include aluminum films.

Choice of the film is dependent upon the product which is to be packaged. As, for instance, in packaging condiments such as catsup and the like for dispensing in fast food industries, films will be chosen which include a metal foil on the outside and a polymeric film on the inside. One or more of the inside layer of these multilayer films is engineered by the film manufacturers such that it will soften and flow during the sealing operation and adhere to the corresponding layer on the opposite film to form a seal between the films.

Typically the "sealing" or inside layer of these composite films will be from about 0.002 to about 0.010 inches in thickness. For the films seen in FIG. 6 and 7 each of the films 68 and 70 is made up of an outside layer 104 and an interior layer 106.

In FIG. 9 the ends of the bars 80 and 82 seen in FIG. 6 are shown in greater detail. For clarity of understanding of the invention the sealing surface 96 is distorted in FIG. 9. For the distorted surface 96 of FIG. 9, the radius which defines the arc has been made much smaller than that utilized for FIG. 6 in order to accentuate the arc of the surface 96. Further, in FIG. 9, coordinate lines X, Y and Z have been added to aid in discussing geometry of the sealing surfaces 90 and 96.

The coordinate lines X, Y and Z are coordinates in an orthogonal coordinate system and define three mutually perpendicular planes, plane X-Y passing through coordinates X and Y, plane Y-Z passing through coordinates Y and Z, and plane X-Z passing through coordinates X and Z. The first or elongated dimension of the bars 80 and 82 extends along the X coordinate of FIG. 9 and the second dimension extends along the Y coordinate.

As seen in FIG. 9, the arcuate surface 96 is defined by the linear edges 98 and the arcuate edge 100. Thus, the arcuate surface 96 is linear in the first direction along the X coordinate, but is arcuate in the second direction along the Y coordinate. Contrary to this the surface 90 of the rear sealing bar 82 is linear in both the first and the second directions, i.e. along both the X and the Y coordinate. The surface 94 is thus flat in both an X-Y plane and a Y-Z plane, whereas the arcuate surface 96 is flat in the X-Y plane but arcuate in the Y-Z plane.

The dimensional brackets A, B and C of FIG. 6 are also included in FIG. 9. The dimension bracket B corresponds to the elongated length of the sealing bars 80 and 82. The dimension bracket A defines the dimension of the surface 96 along the X coordinate while the bracket C defines the dimension of the surface 90 along the X coordinate. It is evident from FIG. 9 that the dimension C is greater than the dimension A.

In FIG. 10, the arcuate edge 100 of the surface 96 is seen in side elevation. The dimension A of FIGS. 6 and 9 has been transposed to FIG. 10 and it is evident from FIG. 10 that this corresponds to the chord 108 of the arcuate edge 100. A further dimension is defined in FIG. 10, dimension D. This corresponds to a radius 110 defining the arc of the edge 100. The radius 110 extends from a center point 112 to the edge 100. An additional dimension defined in FIG. 10 is dimension E which corresponds to the height between the chord 108 and the arcuate edge 100. This height is shown by the height line 114.

The surface 96 is formed as a portion of a cylindrical surface having circumferentially extending arcuate edges, i.e. edges 100 and 102, connected by linear side edges, i.e. edges 98.

While, for the purposes of illustration, the arcuate edges 100 and 102 are formed as a portion of a cylinder (a circle if extended completely around) other surfaces of rotation could be selected as, for instance, an elliptical surface, to define the shape of the arcuate edges 100 and 102. As will be explained in greater detail below, when the dimensions of the surface 96 are coordinated with the thicknesses of the "sealing" layer (or inside layer or layers) of the film, a surface of rotation is selected such that the height 114 for any given chord length 108 is less than the thickness of the inner layers or sealing layers of the films utilized.

In FIG. 7 a cross seal is about to be formed between the films 68 and 70 by the cross seal bars 80 and 82. A liquid 116 has been introduced between the films 68 and 70. As the cross seal bars 80 and 82 come together the outer layers 104 of the films 68 and 70 are contacted by the sealing surfaces 90 and 96 of the sealing bars. As the sealing bars 80 and 82 move closer together liquid 116 located in the area between the surfaces 90 and 96 is displaced upwardly toward the opening between the films 68 and 70 adjacent to the end of the fill tube 66.

At the point wherein the inner layers 106 of the respective films 68 and 70 just touch a chamber 118 as identified in FIG. 8 is created. At this time the film 70 is flattened against the flat sealing surface 90 whereas the film 68 is slightly arcuate against the arcuate surface 96.

Continued depression of the arcuate surface 96 into the film 68 squeezes the film 68 against the film 70 which is flattened against the surface 90. This forces any remaining liquid between the films 68 and 70 outwardly from the expanding contact area between the inner layers 106 of the films 68 and 70 until all liquid is voided from the contact area between the films 68 and 70.

While an incremental amount of liquid has been removed from the contact area of the inside layers 106 of the films 68 and 70 and displaced in to chamber 118, this incremental amount of liquid is much less in volume than that which is forced into the chamber 56 of the prior art device of FIGS. 3 and 4. Because of this, while there is an incremental raise in the pressure within the chamber 118, it is much, much less than that in prior art devices.

The radius of curvature of the arcuate edge 100 of the arcuate sealing surface 96 is selected compared to the width of the sealing surface 96 (the length of its chord 108) such that the height 114 between the chord 108 and the edge 100 is less than the thickness of the sealing layer 106 of the films 68 and 70. Because of this the sealing layers 106 of the films 68 and 70 completely across the width of the edge 100 of the arcuate sealing surface 96 are both pressurized and heated.

This causes displacement of a sealing bead both upwardly and downwardly from the center of the contact area of the sealing surfaces 90 and 96 to form both an upper sealing bead area 120 and a lower sealing bead area 122. As so formed the sealing bead formed between the films 68 and 70 is a variable thickness being the thinnest at a center point identified by the numeral 124 and becomes progressively thicker as one moves outwardly from that center point 124 to areas 126 and 128 which are adjacent to the edges of the area of contact of the sealing surface 96 with the film 68.

Further, since the width (the dimension along the vertical axis of FIGS. 7 and 8) of the seal surface 90 on the cross seal 82 is greater than the width (the dimension also along the vertical axis in FIGS. 7 and 8 or the chord 108 in FIG. 10) of the seal surface 96 in the bead areas 120 and 122, the material of the inside layer 106 of the films 68 and 70 is additionally heated but not compressed. Since it is heated but is not under pressure it softens and flows forming the smooth uniform bead areas 120 and 122 to effect a more complete seal between the films 68 and 70.

In forming pouches and blankets for typical films having inside sealing surfaces ranging in thickness from 0.002 to 0.010 inches in thickness, the ratio of the dimension of the radius of the arc (the radius 110 of edge 107) to the dimension of the chord of that arc (the chord 108) will be from about 4:1 to about 21:1. For a typical seal bar wherein the cord 108 of sealing surface 96 is 0.375 inches across the radius for the arc of the sealing surface 96 will thus be chosen to range from about 1.774 inches for use with 0.010 thick material to about 8.076 inches for use with thinner 0.002 thickness material.

Use of an arcuate shaped sealing surface against a flat sealing surface achieves the complete removal of liquid between the two films 68 and 70. This in turn is augmented by extending the width in the second direction of the flat sealing surface 90 compared to the width (i.e. the chord) of the arcuate sealing surface 96 to form areas of additional heating outside the pressure area along the edges of the seal being formed. These features allow for repetitive formation of uniform imperforate seals between first and second films through a liquid to form liquid filled cells or chambers which are totally devoid of any gas contents therein.

I claim:

1. A seal for a form, fill and seal pouch packaging machine comprising:
   first and second opposing elongated seal bars;
   said first seal bar having a hard smooth unyielding flat planar sealing surface thereon;
   said second seal bar having a hard smooth unyielding nonplanar arcuate sealing surface thereon, said arcuate sealing surface on said second bar shaped as a portion of a curved surface of rotation defined by a pair of distinct parallel linear side edges in a first direction and a pair of distinct arcuate side edges in a perpendicular direction with said surface of rotation extending continuously across the totality of said sealing surface; and
   said arcuate sealing surface of said second seal bar convexly projecting towards said flat planar sealing surface of said first seal bar.

2. A seal of claim 1 wherein:
   said arcuate surface is formed as a portion of an elongated cylindrical surface having circumferentially extending arcuate end edges connected by elongated linear side edges.

3. A seal for a pouch packaging machine comprising:
   first and second opposing elongated seal bars;
   each of said seal bars having a hard smooth unyielding sealing surface thereon;
   in an X, Y, Z orthogonal coordinate system having X-Y, X-Z and Y-Z mutually perpendicular planes and wherein the elongated dimension of said sealing bars extends in a first direction along the X coordinate of said coordinate system, each of said sealing surfaces extending in a first direction along said X coordinate and in a second direction along the Y coordinate of said coordinate system;
   the shape of said sealing surface of said first seal bar in said Y-Z plane being flat;
   the shape of said sealing surface of said second seal bar in said Y-Z plane forming an arc, said arc having a radius greater than about 1.774 inches; and
   said arc of said sealing surface of said second seal bar convexly projecting along said Z coordinate of said coordinate system towards said flat sealing surface of said first seal bar.

4. A seal of claim 3 wherein:
   the length of the chord of said arc of said sealing surface of said second seal bar as measured along said Y coordinate is less than the length of said flat sealing surface of said first seal bar also as measured along said Y coordinate.

5. A seal of claim 4 including:
   said second seal bar being symmetrically positioned with respect to said first seal bar about said Y coordinate such that as measured along said Y coordinate said sealing surface of said first seal bar extends in opposite directions beyond the sealing surface of said second seal bar.

6. A seal of claim 3 wherein:
   said sealing surface of both of said first and said second seal bars is flat along said X coordinate of said coordinate system.

7. A seal for a pouch packaging machine comprising:
   first and second opposing elongated seal bars;
   each of said seal bars having a hard smooth unyielding sealing surface thereon;
   in an X, Y, Z orthogonal coordinate system having X-Y, X-Z and Y-Z mutually perpendicular planes and wherein the elongated dimension of said sealing bars extends in a first direction along the X coordinate of said coordinate system, each of said sealing surfaces extending in a first direction along said X coordinate and in a second direction along the Y coordinate of said coordinate system;
   the shape of said sealing surface of said first seal bar in said Y-Z and X-Y planes being flat;
   the shape of said sealing surface of said second seal bar in said Y-Z plane forming an arc and in said X-Y plane being flat such that said sealing surface on said second seal bar is an arcuate surface defined by two elongated distinct linear edges extending in said X-Y plane and connected by two distinct arcuate edges extending in said Y-Z plane and together said linear edges and said arcuate edges form a surface of rotation which extends across the totality of said sealing surface on said second seal bar; and
   said arc of said sealing surface of said second seal bar convexly projecting along said Z coordinate of said coordinate system towards said flat sealing surface of said first seal bar.

8. A seal of claim 7 wherein:
   the dimension of the radius of the arc of said sealing surface of said second seal bar is from about four times greater to about 21 times greater than the dimension of the chord of the arc of said sealing surface of said second seal bar as measured along said Y coordinate.

9. A seal of claim 8 wherein:

the length of the chord of said arc of said sealing surface of said second seal bar as measured along said Y coordinate is less than the length of said flat sealing surface of said first seal bar also as measured along said Y coordinate.

10. A seal of claim 9 including:
said second seal bar being symmetrically positioned with respect to said first seal bar about said Y coordinate such that as measured along said Y coordinate said sealing surface of said first seal bar extends in opposite directions beyond the sealing surface of said second seal bar.

11. An improvement in a process of setting up a pouch packaging machine and using said pouch packaging machine to seal a first film to a second film to form a pouch, said improvement comprising:
selecting a first seal bar having a flat planar sealing surface thereon;
locating said first seal bar on said packaging machine;
selecting a second seal bar having an arcuate sealing surface thereon, said arcuate sealing surface defined on said second seal bar by two elongated linear edges extending in a first direction and connected by two arcuate edges extending in a second direction with the second direction being perpendicular to said first direction and where the radius of curvature of said arcuate sealing surface is greater than about 1.774 inches;
locating said second seal bar on said packaging machine in a position opposite to said first seal bar with said arcuate surface of said second seal bar convexly projecting towards said flat planar surface of said first seal bar;
heating said flat planar sealing surface and said arcuate sealing surface;
selecting first and second films, at least one of said first and second films selected as a film having an inside surface material which will soften and flow under heat and pressure;
passing said first and second films between said first and second sealing surfaces;
moving said first and second seal bars towards one another to contact said first and second films together under pressure between said first and second seal bars; and
forming a sealing bead between said first and second films from said inside material by transferring heat and pressure to said first and second films from said flat planar and said arcuate sealing surfaces to cause said inside material to flow on the inside surface of said first and second films from a point where the center of said arcuate sealing surface contacts said film outwardly in opposite directions from said center point towards points wherein the ends of said arcuate edges of said arcuate sealing surface join said linear edges of said arcuate sealing surface 12. A process of claim 11 including:
selecting said first seal bar such that its flat planar sealing surface is a rectangular surface wherein two opposite sides of said rectangular surface are of a first dimension and the two other sides are of a dimension greater than the dimension of a chord which connects the ends said arcuate edges of said arcuate surface of said second seal bar;
transferring heat and pressure to said first and second films to extend said sealing bead beyond said points wherein said arcuate edges join said linear edges on said arcuate sealing surface.

13. An improvement in setting up for operation and operating a pouch packaging machine to form a film blanket having a checkerboard like matrix of joined liquid filed pouches, said pouch packaging machine of the type that includes a plurality of pairs of parallel spaced heated opposing side seal bars for forming a plurality of parallel seals between first and second films in a first direction and a pair of heated opposing cross seal bars for forming seals between said films in a second direction, said improvement comprising:
selecting as the first member of said pair of heated opposing cross seal bars a first cross seal bar having a flat planar sealing surface thereon;
selecting as the second member of said pair of heated opposing cross seal bars a second cross seal bar having an arcuate sealing surface thereon;
locating said second cross seal bar on said packaging machine in a position opposite to said first cross seal bar with said arcuate surface of said second seal bar convexly projecting towards said flat planar surface of said first cross seal bar;
selecting first and second films, at least one of said first and second films selected as a film having an inside surface material which will soften and flow under heat and pressure;
passing said first and second films between said side seal bars;
operating said side seal bars to form a plurality of parallel spaced seals between said first and second films;
operating said cross seal bars to form a cross seal between said films with said cross seal crossing over each of said parallel spaced seals forming a plurality of three sided empty chambers;
advancing said film such that said cross seal is displaced from said cross seal bars in a direction away from said side seal bars;
filling said chambers with a liquid to a level wherein the interface between said liquid and said empty chambers is located between said cross seal bars and said side seal bars;
operating said cross seal bars to contact said first and second films together and to displace towards said side seal bars liquid between said films which is located in the area of contact of said cross seal bars with said films;
forming a variable thickness sealing bead between said first and second films from said inside material by transferring heat and pressure to said first and second films from said cross seal bars to cause said inside material located in said area of contact of said cross seal bars with said films to flow on the inside surface of said first and second films from a thin center point outwardly to thicker areas which are adjacent the edges of said area of contact of said cross seal bars with said films.

14. A process of claim 13 further including:
selecting said second seal bar such that said arcuate sealing surface on said second cross seal bar is defined by two elongated distinct linear edges extending in a first direction which are connected by two arcuate edges extending in a second direction with the second direction being perpendicular to said first direction.

15. A process of claim 14 including:

selecting said first cross seal bar such that said flat planar sealing surface on said first cross seal bar is a rectangular surface having two opposite sides that are of a first dimension and two other sides that are of a second dimension wherein the second dimension is greater than the dimension of a chord which connects the ends said arcuate edges of said arcuate surface of said second cross seal bar; and transferring heat and pressure to said first and second films to extend said sealing bead beyond said points wherein said arcuate edges join said linear edges on said arcuate sealing surface.

16. A seal for a form, fill and seal pouch packaging machine comprising:

first and second opposing elongated seal bars;

said first seal bar having a hard smooth unyielding first sealing surface thereon, said first sealing surface extending between ends in a first direction axially along said elongated dimension of said seal bars and between ends in a second direction perpendicular to said first direction;

said second seal bar having a hard smooth unyielding second sealing surface thereon, said second sealing surface extending between ends in said first direction axially along said elongated dimension of side seal bar and between ends in said second direction, the dimension of said second sealing surface between its said ends in said second direction being less than the dimension of said first sealing surface between its said ends in said second direction;

said first seal surface consisting of a flat planar seal surface defined by linear edges in both said first and said second directions;

said second seal surface consisting of a non-planar arcuate shaped seal surface defined by a continuous arcuate edge in said second direction and a distinct linear edge in said first direction;

said arcuate sealing surface of said second seal bar convexly projecting towards said flat planar sealing surface of said first seal bar; and means for positioning said seal bars with respect to one another such that said second sealing surface is positioned with respect to said first sealing surface along said second direction whereby a portion of said first sealing surface extends beyond said ends of said second sealing surface in said second direction.

* * * * *